US010081164B1

(12) United States Patent
Pizzimenti et al.

(10) Patent No.: US 10,081,164 B1
(45) Date of Patent: Sep. 25, 2018

(54) GLASS SUBSTRATE WITH PIGMENTED CERAMIC ENAMEL LAYER

(71) Applicant: FORD MOTOR COMPANY, Dearborn, MI (US)

(72) Inventors: James Pizzimenti, Carleton, MI (US); Larry Agius, Dearborn, MI (US); Paul Kenneth Dellock, Northville, MI (US); Thomas F. Boettger, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/468,247

(22) Filed: Mar. 24, 2017

(51) Int. Cl.
| B32B 3/02 | (2006.01) |
| B32B 17/06 | (2006.01) |
| B32B 9/00 | (2006.01) |
| B32B 37/14 | (2006.01) |
| B60J 1/02 | (2006.01) |

(52) U.S. Cl.
CPC ............. *B32B 17/06* (2013.01); *B32B 9/005* (2013.01); *B32B 37/14* (2013.01); *B60J 1/02* (2013.01); *B32B 2451/00* (2013.01); *B32B 2605/006* (2013.01)

(58) Field of Classification Search
CPC ...... B32B 7/06; B32B 37/14; B32B 2605/006
See application file for complete search history.

(56) References Cited

U.S. PATENT DOCUMENTS

| 3,086,880 | A | 4/1963 | Compton |
| 4,997,687 | A | 3/1991 | Carter |
| 5,086,695 | A | 2/1992 | Czeczota |
| 5,120,570 | A * | 6/1992 | Boaz ..................... C03C 17/00 427/282 |
| 6,656,665 | B1 | 12/2003 | Demars et al. |
| 9,012,016 | B2 | 4/2015 | Jeanrenaud et al. |
| 2006/0154085 | A1* | 7/2006 | Cleary ............. B32B 17/10036 428/426 |
| 2006/0159893 | A1* | 7/2006 | Carney ..................... B44C 1/17 428/195.1 |
| 2008/0003416 | A1* | 1/2008 | Watson ..................... B44C 1/17 428/210 |
| 2012/0244326 | A1 | 9/2012 | Jeanrenaud et al. |
| 2014/0355106 | A1 | 12/2014 | Laluet et al. |

FOREIGN PATENT DOCUMENTS

EP        0807611 A1    11/1997

* cited by examiner

*Primary Examiner* — Elizabeth E Mulvaney
(74) *Attorney, Agent, or Firm* — Marla Johnston; Brooks Kushman P.C.

(57) ABSTRACT

A vehicle windshield assembly including a glass layer, a first layer, and a second layer is disclosed. The glass layer has inner and outer surfaces. The first layer contacts the inner surface of the glass layer, and defines voids in the first layer in a shape of a design. The second layer contacts the first layer and occupies the voids. The first and second layers have a color contrast to enhance visibility of the design.

19 Claims, 3 Drawing Sheets

GLASS SUBSTRATE WITH PIGMENTED CERAMIC ENAMEL LAYER

TECHNICAL FIELD

The present disclosure relates to a glass substrate with a pigmented ceramic enamel layer, for example, for a coating for a vehicle windshield.

BACKGROUND

Many vehicle windshields and backlites utilize glazing to form a ceramic layer thereon. The ceramic enamel layer may define voids to display designs, such as trademarks and logos. The designs formed by the voids may have a low visibility from the exterior of the vehicle, especially when a dark colored ceramic enamel is used to glaze the glass and to form the void for the design.

SUMMARY

According to an embodiment, a vehicle windshield assembly includes a glass layer, a first layer, and a second layer. The glass layer has inner and outer surfaces. The first layer contacts the inner surface of the glass layer, and defines voids in the first layer in a shape of a design. The second layer contacts the first layer and occupies the voids. The first and second layers have a color contrast to enhance visibility of the design.

In one or more embodiments, the glass layer may be a single layer of a glass assembly having a plurality of glass layers. The windshield assembly may also include a third layer contacting the second layer. The third layer and first layer may be the same color. The second layer may be lighter than the first layer. The design in the first layer may be a trademark. The first and second layers may be ceramic enamel layers. The first layer may be pigmented with an achromatic color having an RGB component of (x, y, z), where x, y, and z are equal. The second layer may be pigmented with an achromatic color having an RGB component of (x, y, z), where x, y, and z are equal and greater than zero and less than 255.

According to an embodiment, a vehicle windshield assembly includes a glass layer, a first layer, and a second layer. The glass layer has inner and outer surfaces. The first layer contacts the inner surface of the glass layer and defining voids in a shape of a design. The second layer contacts the first layer and occupies the voids. The second layer has a color lighter than the first layer to enhance visibility of the design.

In one or more embodiments, the first and second layers may be ceramic enamel layers. The glass layer may be a single ply of a multi-layer glass assembly. The design may be a trademark. The first layer may be pigmented with an achromatic color having an RGB component of (x, y, z), where x, y, and z are equal. The second layer may be pigmented with an achromatic color having an RGB component of (x, y, z), where x, y, and z are equal and greater than zero and less than 255.

According to an embodiment, a method of producing a vehicle windshield assembly includes applying a first layer having a color to an inner surface of a glass layer, forming a design in the first layer by defining voids in the first layer, applying a second layer to the first layer and filling the voids. The second layer is color-contrast to the first layer to increase visibility of the design.

In one or more embodiments, applying a first layer and second layer may include glazing with a ceramic enamel. The glass layer may be a single ply of a multi-layer glass assembly. The second layer may be lighter than the first layer. The method may further comprise applying a third layer to the second layer.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
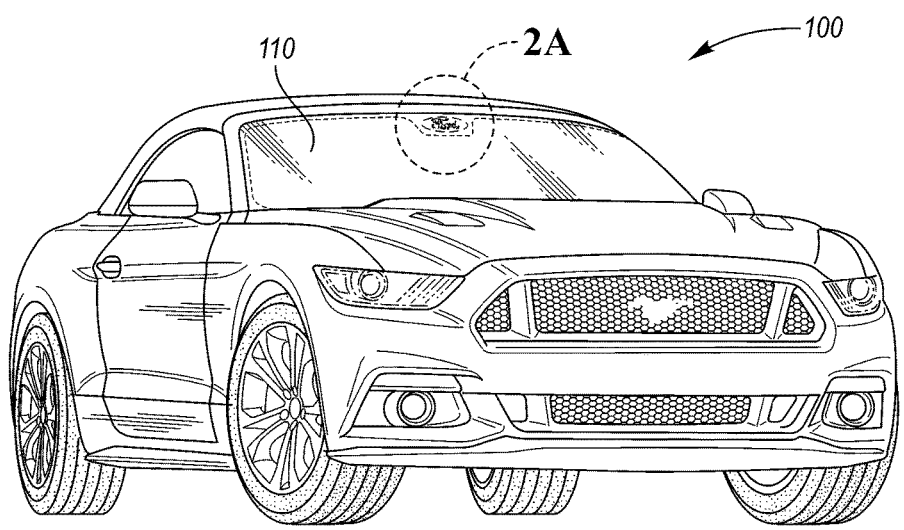
FIG. 1 is a perspective view of an exemplary vehicle with a prior art windshield.

As shown in FIG. 1, an exemplary vehicle 100 is shown. The vehicle may be, but is not limited to, car, truck, or sport-utility vehicle. Vehicles typically utilize glass windshields 110, windows, and quarter glass. The glass windshields 110 can be front windshields or backlites for the rear of the vehicle. Automotive branding can be used on any of front windshield, backlite, or quarter glass to protect aftermarket sales. For illustrative purposes, the present disclosure refers to a windshield.

Figure 2A:
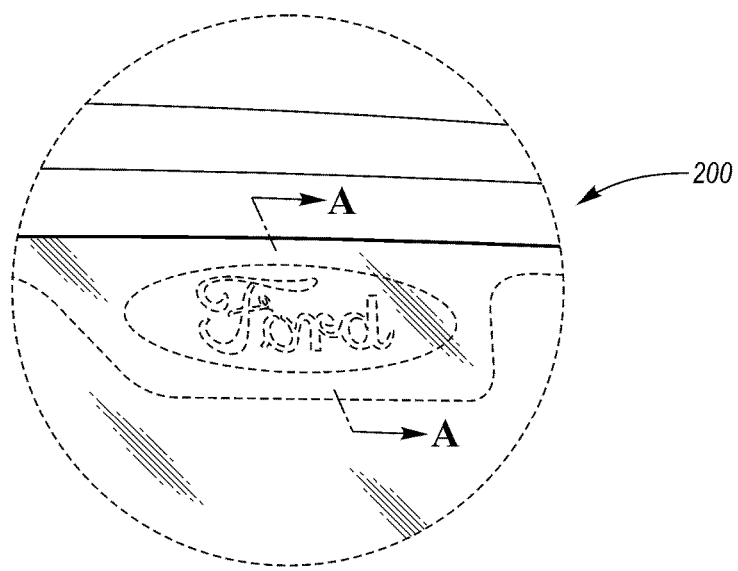
FIG. 2A is a fragmented, front view of the prior art windshield.
Figure 2B:
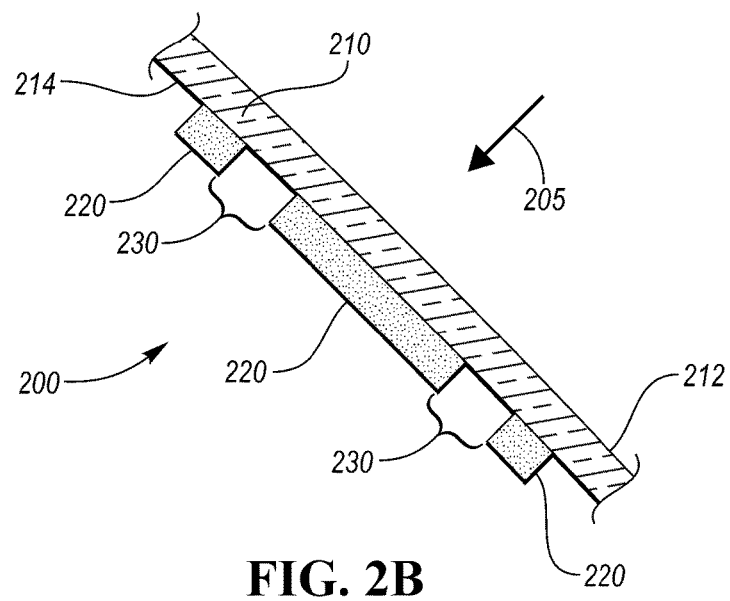
FIG. 2B is a fragmented, cross-sectional view of the prior art windshield along the line A-A'.

As shown in FIGS. 2A and 2B, a prior art windshield assembly 200 includes a glass layer 210 having an outer surface 212 and inner surface 214. The outer surface 212 may be exposed to the exterior of the vehicle, and the surface 214 may correspond to the interior of the vehicle, in direction 205. Although shown as a single layer, the glass layer may be a single pane of glass or part of a laminated glass assembly having multiple layers (plies). The glass layer 210 may be an inner layer of a multi-layer glass assembly, where outer surface 212 is exposed to an outer ply having a surface exposed to the exterior of the vehicle, and an inner surface facing the outer surface 212 of the glass layer 210. Alternatively, the glass layer 210 may be an outer layer of a multi-layer glass assembly, where the inner surface 214 relates to an outer surface of an inner ply.

The inner surface 214 of the glass layer 210 is coated with a first layer 220. In the case of a multi-layer glass, the first layer 220 is coated on the inner surface of whichever ply in the direction of 205 from the exterior to interior. The first layer 220 may be applied by various techniques including, but not limited to, glazing or laminating. The first layer 220 defines voids 230. The voids 230 in the first layer 220 form a pattern or design. The design may be a trademark or logo. The first layer 220 is typically a dark colored ceramic enamel. The darkness of the first layer 220 on the glass may obstruct visibility of the design.

Figure 3A:
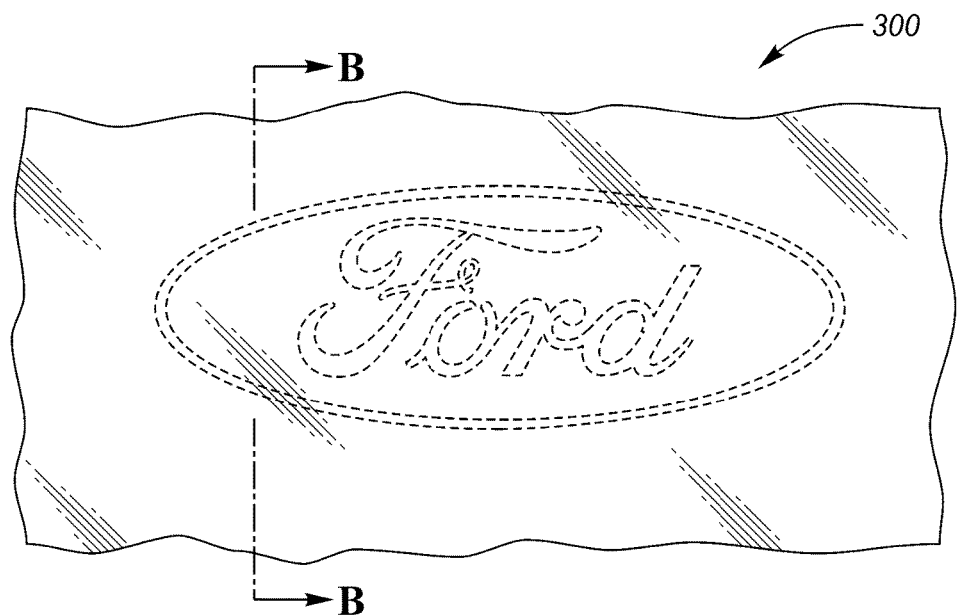
FIG. 3A is a fragmented, front view of a windshield according to an embodiment.
Figure 3B:
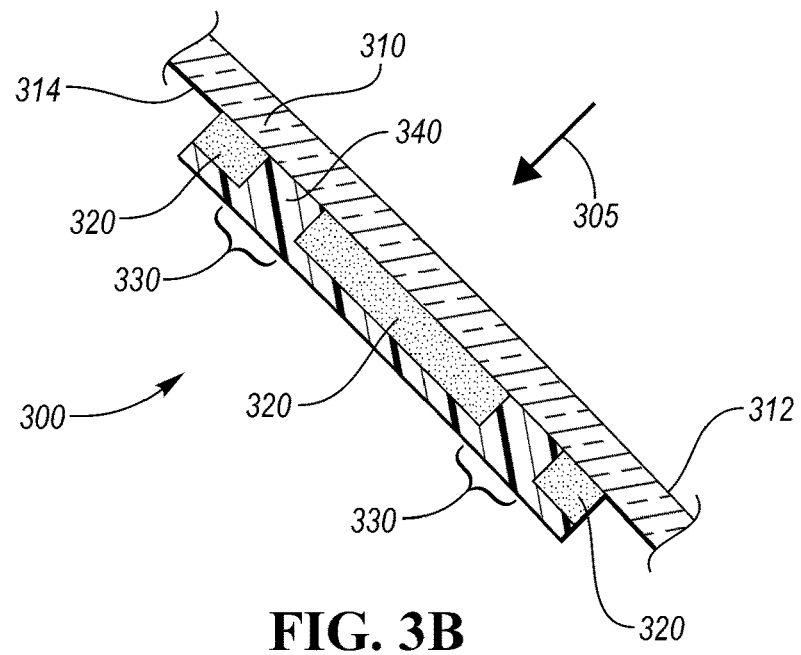
FIG. 3B is a fragmented, cross-sectional view of the windshield of FIG. 3A along line B-B' according to an embodiment.
Figure 3C:
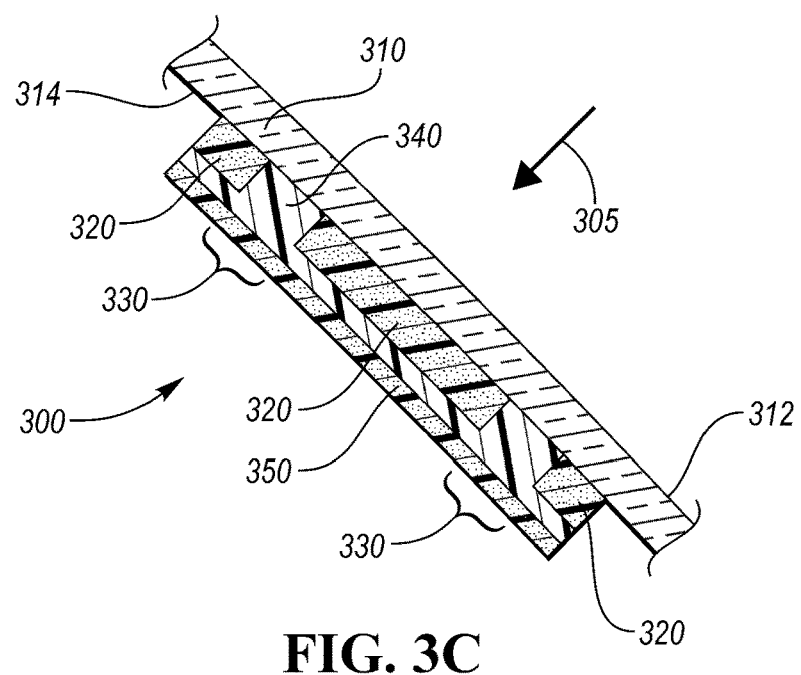
FIG. 3C is a fragmented, cross-sectional view of an alternative windshield according to an embodiment.

FIGS. 3A, 3B, and 3C show a windshield assembly 300 according to one or more embodiments of the present disclosure. Windshield assembly 300 includes a glass layer 310 having an outer surface 312 and an inner surface 314, from exterior to interior of the vehicle in direction 305. The glass layer 310 may be a single pane of glass or part of a laminated glass assembly having multiple layers (plies). The glass layer 310 may be an inner layer of a multi-layer glass assembly, where outer surface 312 is exposed to an outer ply inner surface having an outer surface exposed to the exterior of the vehicle, and an inner surface 314 facing and exposed to the interior of the vehicle. Alternatively, the glass layer 310 may be an outer layer (outer ply) of a multi-layer glass assembly, where the inner surface 314 corresponds to an outer surface of an inner ply.

The inner surface 314 is coated with a first layer 320. In the case of a multi-layer glass, the first layer 320 is coated on the inner surface 314 of any ply of the multi-layer glass in the direction of 305 from the exterior to the interior. Although a single ply glass layer is shown for illustrative purposes, the first coating layer 320 may be applied to the inside surface of an outer ply of glass in a multi-layer glass. The first layer 320 may be applied by various techniques including, but not limited to, glazing or laminating. The first layer 320 defines voids 330. The voids 330 in the first layer 320 form a pattern or design. In certain embodiments, the design is a trademark or logo. The windshield assembly 300 further includes a second layer 340 coated on the first layer 320, towards the interior in direction 305, and filling the voids 330. The first layer 320 and second layer 340 may be colored layers, having color-contrasted colors or darker/lighter colors to enhance visibility of the design from the exterior of the vehicle. The color-contrast and dark/light colors are discussed in further detail below. According to one or more embodiments, the first layer 320 and second layer 340 are ceramic enamel layers. More particularly, the first layer 320 and second layer 340 may be colored ceramic enamel layers. The relative thicknesses of the first layer 320 and the second layer 340 are shown for illustrative purposes, and may vary in thickness. For example, the first layer 220 may be thinner than the second layer 220, or vice versa.

In an embodiment, as shown in FIG. 3C, the windshield assembly 300 may also include a third layer 350 coated on the second layer 340, towards the interior in direction 305. In an embodiment, third layer 350 may be colored, having the same color as the first layer 320. In certain embodiments, the third layer 350 may be any color suitable for the interior of the vehicle. The third layer 350 may be a ceramic enamel layer. More particularly, the third layer 350 may be a colored ceramic enamel layer. The relative thickness of the third layer 350 is shown for illustrative purposes, and may vary in thickness.

According to one or more embodiments, the first layer 320 and second layer 340 may be colored ceramic enamel. In certain embodiments, the first layer 320 is colored such that it is pigmented with a black color. Black is an achromatic color (i.e., having zero chroma), defined by the standard color space system (RGB) as having component values (0, 0, 0). Although (0, 0, 0) is pure black, for purposes of this disclosure, black includes lighter shades of black having an (x, y, z) where x, y, and z are greater than zero. The lighter shades of black appear black to the naked eye, before entering the visibly grey scale. As x, y, and z approach the value 255, the color approaches white. In a refinement, when the first layer 320 is a black ceramic enamel, the second layer 340 is a grey ceramic enamel. The grey color is any achromatic color (i.e., having zero chroma), having a shade between white (255, 255, 255) and black (0, 0, 0). The RGB color space location of shades of grey requires for (x,y,z), x, y, and z to have the same value. For lighter greys, the values for x, y, and z are higher on the RGB scale. For example, light grey has the location (211, 211, 211). A dim gray has the location (105, 105, 105). As the shade gets darker, it approaches the location of black, whereas as the shade gets lighter, it approaches the location of white.

In certain embodiments, the second layer 340 is pigments with a color lighter than the color of the first layer 320 to enhance the visibility of the design formed in the windshield assembly 300. For a color to be lighter than another, the RGB component value for the lighter color may have at least one of x, y, or z having a greater value (i.e., closer to white) than the original color. For example, if the first layer 320 is black (0, 0, 0), the second layer 340 may be (50, 50, 50), (50, 50, 165), or (255, 199, 6). In an embodiment, the second layer 340 may be a shade of grey, where x, y, and z are equal, greater than zero, and less than 255.

In certain embodiments, the second layer 340 is color-contrast with the first layer 320 to enhance visibility of the design formed in the windshield assembly 300. Color-contrast colors are not limited to complementary colors (e.g., those opposite on a color wheel which cancel and produce a white/gray scale achromatic color). Color-contrast colors include any combination of colors enhancing the visibility of the design, with one of the layers being a darker shade of a color, and the other layer being a lighter shade of any color, not necessarily the same color or complementary color. The two need not cancel to a white/gray scale.

A method of producing a windshield assembly is also provided. The method includes applying a first layer to an inner surface of a glass layer, forming a design in the first layer by defining voids in the first layer, and applying a second layer, color-contrasted with the first layer, to the void to increase visibility of the design. Applying the layers may be by various techniques such as glazing with a ceramic enamel. In some embodiments, the method also includes applying a third layer to the second layer. The third layer may be a colored ceramic enamel. The third layer may have the same color as the first layer, or may have any color suitable to the interior of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle windshield assembly comprising:
    a glass layer having inner and outer surfaces;
    a first layer contacting the inner surface of the glass layer and defining voids in a shape of a design; and
    a second layer contacting the first layer and occupying the voids, the first and second layers having a color contrast to enhance visibility of the design.

2. The vehicle windshield assembly of claim 1, wherein the glass layer is a single layer of a glass assembly having a plurality of glass layers.

3. The vehicle windshield assembly of claim 1, further comprising a third layer contacting the second layer.

4. The vehicle windshield assembly of claim 3, wherein third layer and first layer are the same color.

5. The vehicle windshield assembly of claim 1, wherein the second layer is lighter than the first layer.

6. The vehicle windshield assembly of claim 1, wherein the design is a trademark.

7. The vehicle windshield assembly of claim 1, wherein the first and second layers are ceramic enamel layers.

8. The vehicle windshield assembly of claim 1, wherein the first layer is pigmented with an achromatic color having an RGB component of (x, y, z), where x, y, and z are equal.

9. The vehicle windshield assembly of claim 1, wherein the second layer is pigmented with an achromatic color having an RGB component of (x, y, z), where x, y, and z are equal and greater than zero and less than 255.

10. A vehicle windshield assembly comprising:
   a glass layer having inner and outer surfaces;
   a first layer contacting the inner surface and defining voids in a shape of a design, and having an achromatic color with an RGB component of (x, y, z), where x, y, and z are equal; and
   a second layer contacting the first layer and occupying the voids, and having a color lighter than the first to enhance visibility of the design.

11. The vehicle windshield assembly of claim 10, wherein the first and second layers are ceramic enamel layers.

12. The vehicle windshield assembly of claim 10, wherein the glass layer is a single ply of a multi-layer glass assembly.

13. The vehicle windshield assembly of claim 10, wherein the design is a trademark.

14. The vehicle windshield assembly of claim 10, wherein the second layer is pigmented with an achromatic color having an RGB component of (x, y, z), where x, y, and z are equal and greater than zero and less than 255.

15. A method of producing a vehicle windshield assembly comprising:
   applying a first layer having a color to an inner surface of a glass layer;
   forming a design in the first layer by defining voids in the first layer; and
   applying a second layer to the first layer and filling the voids, the second layer being color-contrast to the first layer to increase visibility of the design.

16. The method of claim 15, wherein applying a first layer and second layer include glazing with a ceramic enamel.

17. The method of claim 15, wherein the glass layer is a single ply of a multi-layer glass assembly.

18. The method of claim 15, wherein the second layer is lighter than the first layer.

19. The method of claim 15, further comprising applying a third layer to the second layer.

* * * * *